United States Patent
Kouno et al.

(10) Patent No.: US 10,312,858 B2
(45) Date of Patent: Jun. 4, 2019

(54) SOLAR POWER GENERATION SYSTEM AND FAILURE DIAGNOSIS METHOD THEREFOR

(71) Applicant: Hitachi, Ltd., Chiyoda-ku, Tokyo (JP)

(72) Inventors: Toru Kouno, Tokyo (JP); Tetsuharu Ohya, Tokyo (JP); Yuuichi Nagayama, Tokyo (JP); Tomoharu Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 209 days.

(21) Appl. No.: 15/018,244

(22) Filed: Feb. 8, 2016

(65) Prior Publication Data

US 2016/0233830 A1 Aug. 11, 2016

(30) Foreign Application Priority Data

Feb. 10, 2015 (JP) .................................. 2015-024314

(51) Int. Cl.
*H02S 50/10* (2014.01)

(52) U.S. Cl.
CPC .................................... *H02S 50/10* (2014.12)

(58) Field of Classification Search
CPC ............................... H02S 50/10; G01R 31/36
See application file for complete search history.

(56) References Cited

U.S. PATENT DOCUMENTS

| 9,506,971 | B2 * | 11/2016 | Kohno | ..................... H02S 50/10 |
| 2011/0140520 | A1 * | 6/2011 | Lee | ................... H01L 31/02021 |
| | | | | 307/25 |

| 2012/0247542 | A1 | 10/2012 | Ammer et al. |
| 2012/0268158 | A1 | 10/2012 | Miyata et al. |
| 2012/0296584 | A1 * | 11/2012 | Itoh ........................... G05F 1/67 |
| | | | 702/58 |
| 2012/0310427 | A1 | 12/2012 | Williams et al. |

(Continued)

FOREIGN PATENT DOCUMENTS

| JP | 2005-340464 A | 12/2005 |
| JP | 2010-123880 A | 6/2010 |

(Continued)

OTHER PUBLICATIONS

Extended European Search Report issued in counterpart European Application No. 16154621.3 dated Jun. 27, 2016 (three (3) pages).

*Primary Examiner* — Khamdan N. Alrobaie
(74) *Attorney, Agent, or Firm* — Crowell & Moring LLP

(57) ABSTRACT

A monitor device in a solar power generation system extracts a first time band indicating a minimum amount of solar radiation and a second time band indicating a maximum amount of solar radiation in a day, and calculates, using a ratio of operation and short-circuit currents in a solar battery array, an expected electric power value of a solar battery string to be inspected in each of the first and second time bands. From measurement electric power values of the solar battery string to be inspected in the time bands, the expected electric power value of the first time band, and the expected electric power value of the second time band, first and second electric power losses in the first and second time bands are calculated, and a failure in the solar battery string to be inspected is detected based on the first and second electric power losses.

15 Claims, 15 Drawing Sheets

(56) References Cited

U.S. PATENT DOCUMENTS

2013/0300449 A1\* 11/2013 Nakamura ........ H01L 31/02021
324/761.01
2014/0058688 A1\* 2/2014 Kohno ................... G01R 31/02
702/58

FOREIGN PATENT DOCUMENTS

JP 5584622 B2 9/2014
WO WO 2014/081967 A1 5/2014

\* cited by examiner

Fig. 1
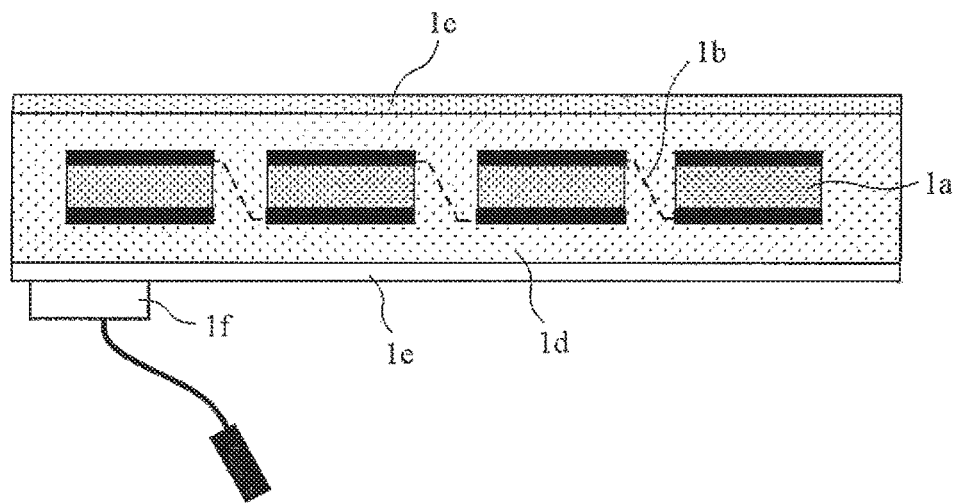
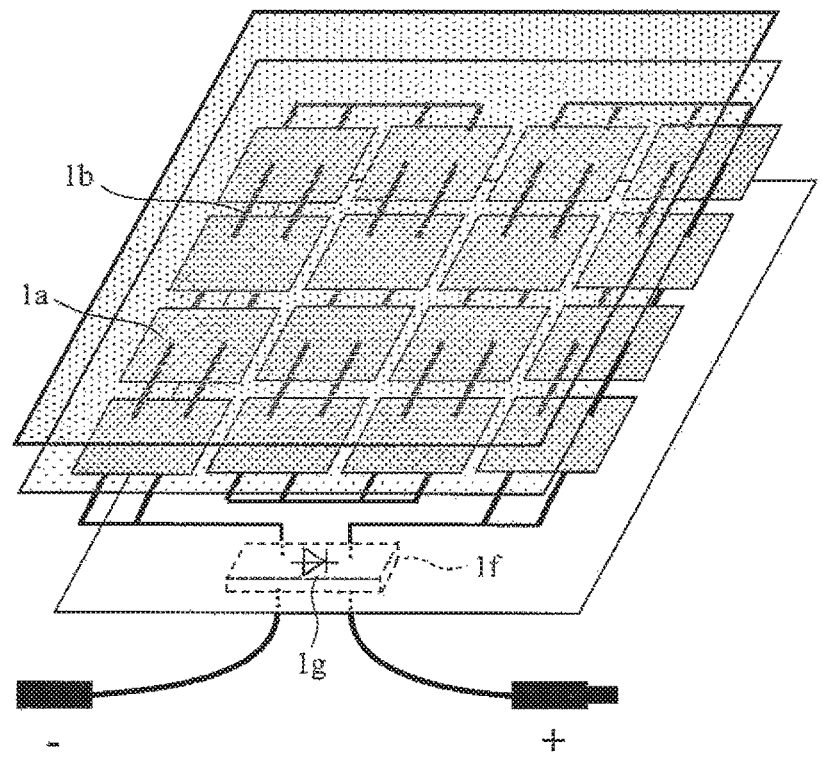

| Description | Summary | Equivalent circuit |
|---|---|---|
| Solder peeling | Solder plating peelded from interconnector 1b | Value of series resistor 2d increased |
| Cell degradation | Performance degradation of PV cell 1a | Shunt resistor value 2c increased |
| Disconnection | Bypass diode 1g ON when solder peeling or cell degradation is large | Bypass diode 1g becomes valid |

Fig. 15A

| Diagnosis result | | | | | | |
|---|---|---|---|---|---|---|
| NO | Date/time of diagnosis | String NO. | Ideal power kW | Actual power kW | Diagnosis result | 5 sec data display |
| 1 | Dec 13, 2013 10:10:10 | 1 | | | Disconnection | ·Display |
| 2 | Nov 13, 2013 10:02:10 | 2 | | | Solder peeling | ·Display |

Fig. 15B

| Time | String voltage V | String current A | PCS voltage V | PCS current A | Time | String voltage V | String current A | PCS voltage V | PCS current A |
|---|---|---|---|---|---|---|---|---|---|
| 12:30:00 | | | | | 13:45:00 | | | | |
| 12:30:05 | | | | | 13:45:05 | | | | |
| 12:30:10 | | | | | 13:45:10 | | | | |
| 12:59:50 | | | | | 14:14:50 | | | | |
| 12:59:55 | | | | | 14:14:55 | | | | |
| 13:00:00 | | | | | 14:15:00 | | | | |

SOLAR POWER GENERATION SYSTEM AND FAILURE DIAGNOSIS METHOD THEREFOR

The present application claims priority from Japanese patent application JP 2015-024314 filed on Feb. 10, 2015, the content of which is hereby incorporated by reference into this application.

BACKGROUND

Technical Field

The present invention relates to solar power generation systems and failure diagnosis methods therefor, such as a failure diagnosis technology for a solar power generation system including a number of solar battery modules.

Background Art

In a large-scale solar power generation system such as represented by a large photovoltaic power plant, thousands to hundreds of thousands of 200 to 300 W-class solar battery modules are installed at a single generation site. The large-scale solar power generation system requires failure detection technology and maintenance technology. Outputs from the solar battery modules for the same solar radiation amount and temperature conditions gradually decrease due to aging degradation. However, some of the modules may lose their output rapidly due to manufacturing quality or physical damage. In the present specification, the state of a rapid decrease in output will be referred to as a "failure".

In order to detect failure from the thousands to hundreds of thousands of 200 to 300 W-class solar battery modules, Patent Document 1 proposes a failure determination method whereby a measurement means and a communication means are provided for each solar battery module, and results transmitted from the communication means are compared with a threshold value. Patent Document 2 describes a method for determining failure by, due to measurement means cost restrictions, connecting measurement means in the unit of a "solar battery string" in which solar battery modules are connected in series. Further, Patent Document 3 describes a method whereby a string average current calculated from an overall average is compared with each string current, and a failure is recognized when there is a certain ratio of decrease in the string current. Thus, Patent Documents 1 to 3 describe a method whereby measurement means and communication means are provided on a solar battery module basis, and a method whereby measurement means and communication means are provided on a solar battery string basis.

RELATED ART DOCUMENTS

Patent Documents

Patent Document 1: JP 2010-123880 A
Patent Document 2: JP 2005-340464 A
Patent Document 3: JP 5584622 B

SUMMARY

While the measurement means and communication means for the individual solar battery string are typically installed in a connection box for parallel connection of the solar battery strings, the measurement means and communication means that are mounted for each solar battery module require newly preparing an installation means for their installation. The installation means needs to have a service life of 10 to 20 years, resulting in a very large installation cost. Accordingly, many large photovoltaic power plants typically adopt the method of providing the measurement means and communication means for each solar battery string.

Patent Document 1 also describes providing a threshold value for determining a failed solar battery string. Patent Document 2 also describes previously storing standard output electric power values for the hours of sunlight, and comparing the standard output electric power values with an output to determine a failure. Patent Document 3 also describes a method of determining a failure by comparing a string current average value with the current of each string.

However, in the conventional solar battery system inspection methods disclosed in Patent Documents 1 to 3, the output characteristics are greatly varied by environmental conditions, such as solar radiation intensity and atmospheric temperature. Accordingly, it is difficult to set a threshold value for determining a decrease in the output from a solar battery string due to solar battery module failure or degradation. In addition, it is also difficult to estimate what kind of failure is caused in the solar battery string, making it difficult to prepare a subsequent maintenance plan for the generation site.

The present invention was made in view of the above circumstances, and provides a technology enabling failure determination based on a smaller output change when a measurement means or a communication means is installed for each solar battery string of a large-scale solar power generation system. The present invention also provides a technology enabling identification of a factor causing a failure in a solar battery string.

In order to solve the problem, the present invention provides a solar power generation system including a solar battery array having a plurality of solar battery strings connected in parallel, each solar battery string comprising a plurality of solar battery modules connected in series The system includes a plurality of string measurement units that measure a current and voltage of each of the plurality of solar battery strings; an array measurement unit that measures a current and voltage of the solar battery array; and a computer that calculates an electric power loss of each of the plurality of solar battery strings and that detects a failure in each solar battery string. The computer performs (i) a process of acquiring information about the amount of change in solar radiation in each of predetermined time bands in a day, and extracting, from among the predetermined time bands of which the amount of change in solar radiation is smaller than a predetermined amount of change in solar radiation, a first time band indicating a minimum amount of solar radiation and a second time band indicating a maximum amount of solar radiation, (ii) a process of calculating, using a ratio of operation current and short-circuit current in the solar battery array, an expected electric power value of a solar battery string to be inspected in each of the first and second time bands, (iii) a process of calculating, from a measurement electric power value of the solar battery string to be inspected in the first and second time bands, the expected electric power value in the first time band, and the expected electric power value in the second time band, a first electric power loss in the first time band and a second electric power loss in the second time band, and (iv) a process of detecting, based on the first and second electric power losses, a failure in the solar battery string to be inspected.

Additional features of the present invention will become apparent from the following description in the present specification and the attached drawings. Various aspects of the present invention will be achieved or implemented by elements or various combinations of elements, and by the following detailed descriptions and the aspects set forth in the attached claims.

According to the present invention, solar battery string failure can be detected even with a smaller output change in a large-scale solar power generation system.

BRIEF DESCRIPTION OF DRAWINGS

FIG. 1 illustrates a configuration example of a solar battery module according to an embodiment of the present invention.

FIGS. 15A and 15B illustrate a screen example (GUI) for displaying a failure determination result of the solar battery string according to the first embodiment of the present invention.

DETAILED DESCRIPTION OF THE EMBODIMENTS

Figures 2, 3:
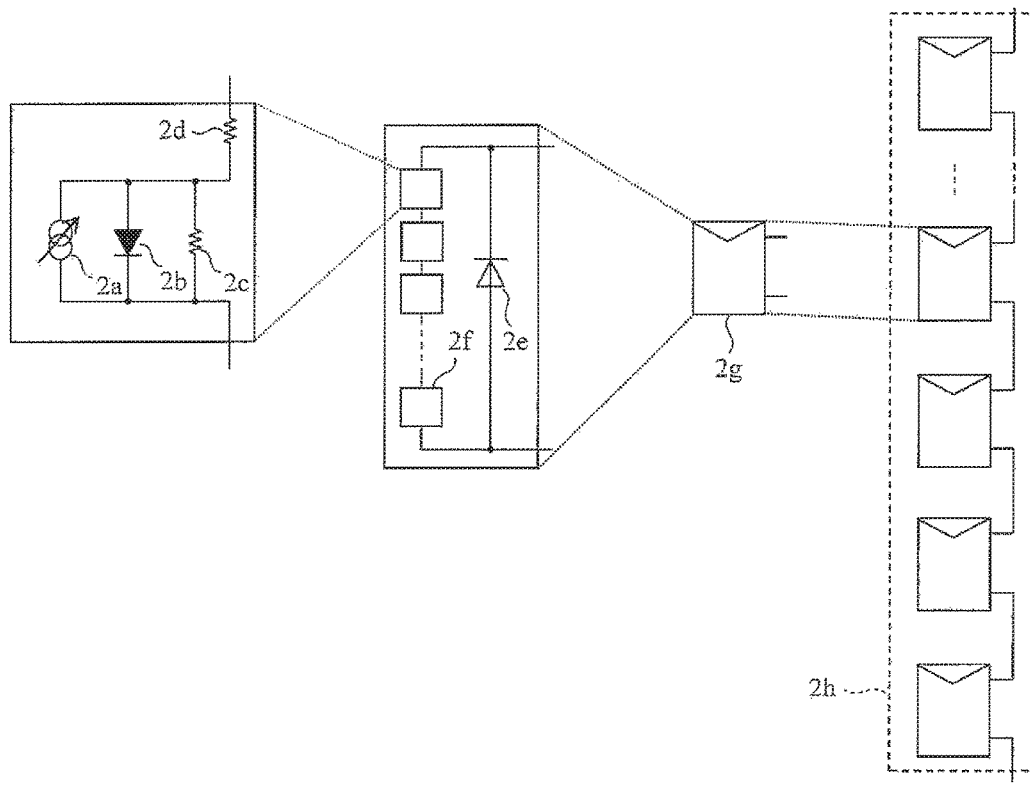
FIG. 2 illustrates a configuration example of a solar battery string and wiring according to an embodiment of the present invention.
FIG. 3 illustrates the relationship between a solar battery failure and its factor according to an embodiment of the present invention.

In the following, embodiments of the present invention will be described with reference to the attached drawings. While the attached drawings illustrate specific embodiments and implementation examples in accordance with the principle of the present invention, they are set forth to provide an understanding of the present invention and are not to be taken to interpret the present invention in a limited sense.

While the embodiments will be described with sufficient detail to enable persons skilled in the art to practice the present invention, it should be understood that other implementations or aspects are also possible, and that various modifications of configurations or structures or substitution of various elements are possible without departing from the scope of the technical concept and spirit of the present invention. Accordingly, the following description should not be construed as limiting the present invention to the specific embodiments.

An embodiment of the present invention may be implemented by software running on a general-purpose computer, as will be described later, or by dedicated hardware or a combination of software and hardware.

While in the following, various processes in the embodiments of the present invention will be described by referring to a "CPU (processor)" as the subject (agent of operation), the description may refer to a program as the subject. A process disclosed by referring to a program as the subject may be a process performed by a computer, such as a management server, or an information processing device. Part or all of a program may be implemented by dedicated hardware or in modules. Various programs may be installed in respective computers using a program distribution server or a storage medium.

(A) First Embodiment

A first embodiment discloses a method whereby an expected amount of solar radiation and an expected temperature are determined in two time bands from an operation current and an operation voltage of a solar battery array (array: that which is configured by connecting a plurality of strings in parallel); an ideal electric power (theoretically expected electric power) of a solar battery string (string: that which is configured by connecting a plurality of modules in series) under the conditions of the calculated expected amount of solar radiation and expected temperature is compared with an actual electric power (electric power obtained by actual measurement) of the string; and a failure diagnosis for the solar battery string is made based on the ratio of the ideal electric power and the actual electric power in the two time bands. First, a solar power generation system at a large photovoltaic power generation plant to which the embodiment of the present invention is applied will be described, followed by a description of the failure diagnosis method.

<Configuration of Solar Module>

FIG. 1 illustrates a configuration example of a solar battery module according to the embodiment of the present invention. Solar battery cells 1a, which are a major component of the solar battery module, are connected by soldering electrodes of the cells via wiring 1b called an inter-connector. A filler 1d adheres the solar battery cells 1a, a glass 1c, and a back sheet 1e together while protecting the solar battery cells 1a and the wiring 1b from shock. In a junction box 1f, a bypass diode 1g is mounted.

FIG. 2 illustrates a configuration example of an equivalent circuit of the solar battery module. As illustrated in FIG. 2, the solar battery module 2g can be represented by a plurality of solar battery cells 2f arranged in series and is sectioned by a bypass diode 2e. The bypass diode 2e is provided to prevent reverse current flow when a reverse bias is applied to the solar battery module 2g. A plurality of the solar battery modules 2g arranged in series is referred to as a solar battery string 2h. The solar battery cells 2f can be represented by an equivalent circuit including a current source 2a, a p-n junction diode 2b, a shunt resistance (representing the degree of leak current between p-n junction) 2c, and a series resistance 2d. As illustrated in FIG. 2, the equivalent circuit comprises a parallel connection of the power supply 2a, the p-n junction diode 2b, and the shunt resistance 2c, with the series resistance 2d connected in series thereto. A current proportional to the amount of solar radiation is supplied from the current source 2a.

<Factors of Solar Battery Module Degradation/Failure>

FIG. 3 is a diagram for describing the factors of solar battery module degradation/failure.

The factors of solar battery module degradation/failure include not only degradation of the PV cells (corresponding to the cells 1a), which is a major component, but also largely degradation of the filler of the module or wiring material connecting the cells. Such degradation/failure phenomenon is reflected in the equivalent circuit parameters, as indicated in FIG. 3, and can be quantitatively tracked. The failures and degradations due to components can be generally classified into several failure modes (solder peeling, cell degradation, and disconnection), and are reflected in the equivalent circuit parameters (series resistance, shunt resistance, and bypass diode operation) on a mode by mode basis.

(i) Case of Solder Peeling

Figure 4A:
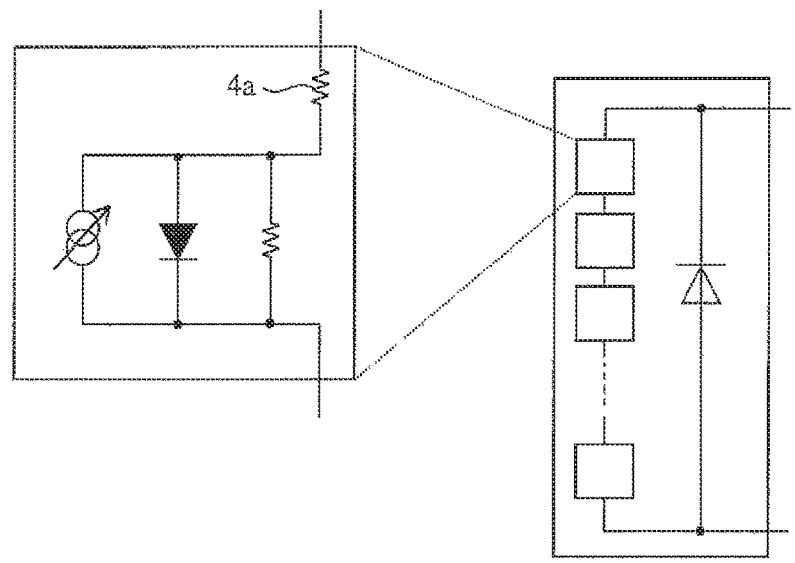
FIG. 4A illustrates a main factor in an equivalent circuit of a solar battery in the event of solder peeling according to an embodiment of the present invention.

FIG. 4A illustrates equivalent circuit parameters in a case where the failure mode is solder peeling. In the case of solder peeling, the value of the series resistance 4a increases. Because the resistance of a wiring portion through which current flows is increased when there is solder peeling as the failure mode, a voltage drop increases as the amount of solar radiation increases, resulting in greater loss.

Figure 4B:
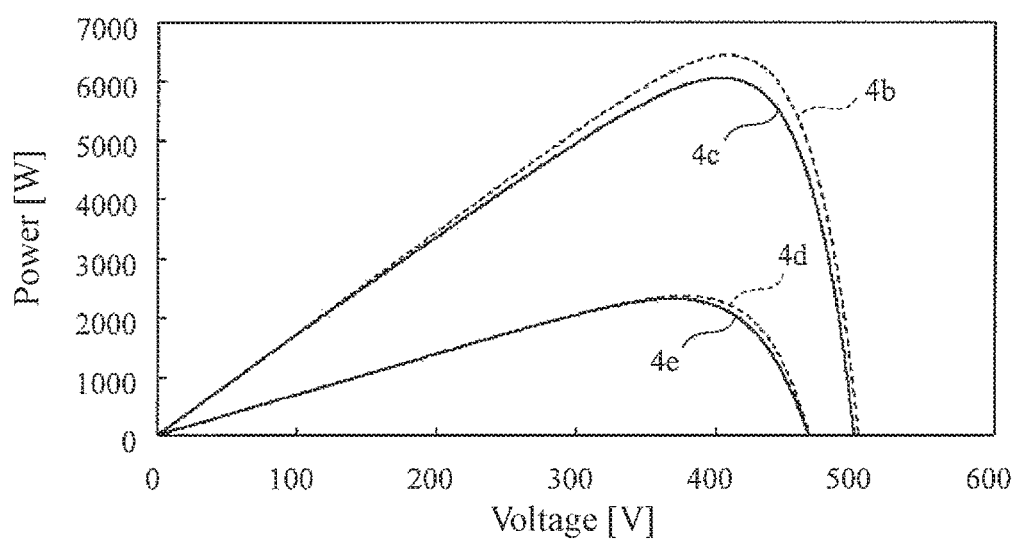
FIG. 4B illustrates a change in solar battery string characteristics in the event of solder peeling.

FIG. 4B illustrates the loss (example) in the case of solder peeling. While a string that normally has characteristics indicated by a power-voltage curve 4b when the amount of solar radiation is 1.0 kW/m$^2$, the characteristics of the string with solder peeling are changed to the characteristics indicated by a power-voltage curve 4c. In this case, the amount of loss is 4.5%. Meanwhile, a string that normally has the characteristics indicated by a power-voltage curve 4d when the amount of solar radiation is 0.4 kW/m$^2$ has the characteristics changed to those indicated by a power-voltage curve 4e when solder peeling is caused, where the amount of loss is 2.1%.

(ii) Case of Cell Degradation

Figure 5A:
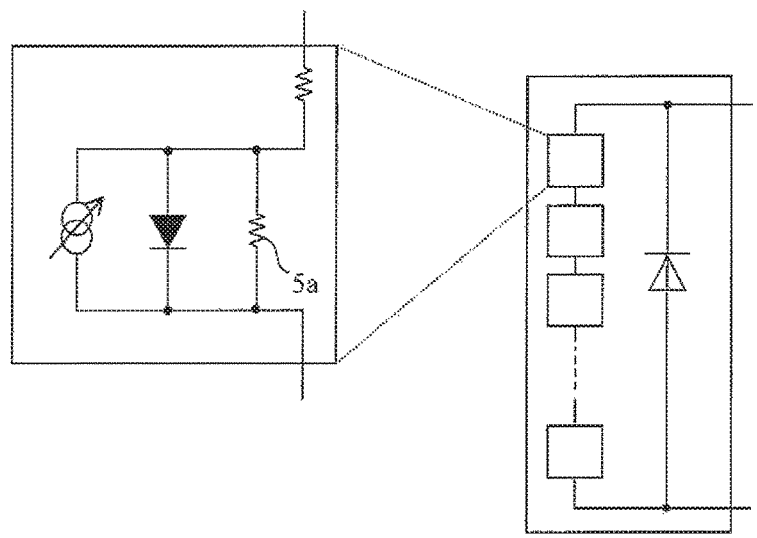
FIG. 5A illustrates a main factor in an equivalent circuit of a solar battery in the event of cell degradation according to an embodiment of the present invention.

FIG. 5A illustrates equivalent circuit parameters when the failure mode is cell degradation. When a cell becomes degraded, the value of the shunt 5a is decreased. In this case, the ratio of leak current is increased as the amount of solar radiation becomes smaller, resulting in greater loss.

Figure 5B:
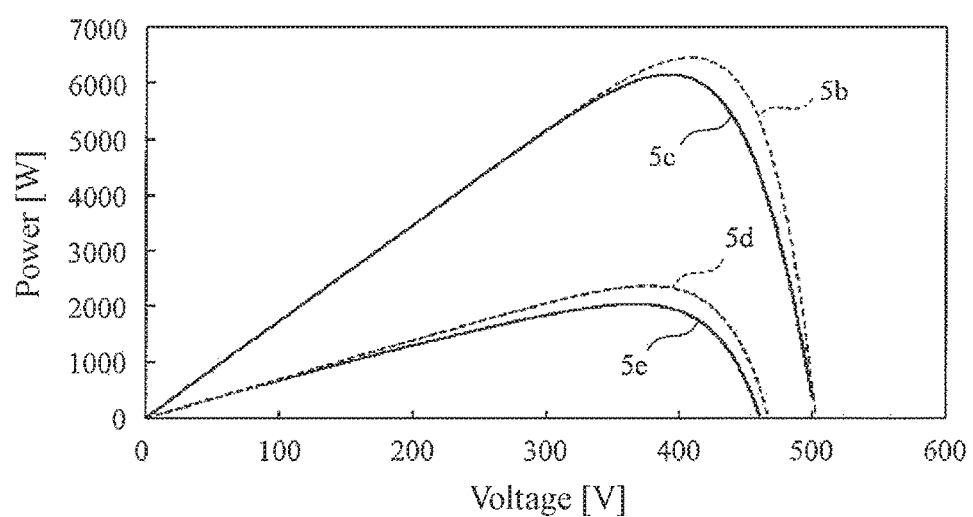
FIG. 5B illustrates a change in solar battery string characteristics in the event of cell degradation.

FIG. 5B illustrates the loss (example) in the case of cell degradation. While a string that normally has characteristics indicated by a power-voltage curve 5b when the amount of solar radiation is 1.0 kW/m$^2$, the characteristics are changed to those indicated by a power-voltage curve 5c when cell degradation is caused in the string. In this case, the amount of loss is 5.6%. Meanwhile, while a string that normally has the characteristics indicated by a power-voltage curve 5d when the amount of solar radiation is 0.4 kW/m$^2$, the characteristics are changed to those indicated by a power-voltage curve 5e when cell degradation is caused in the string, where the amount of loss is 13.9%.

(iii) Case of Disconnection

Figure 6A:
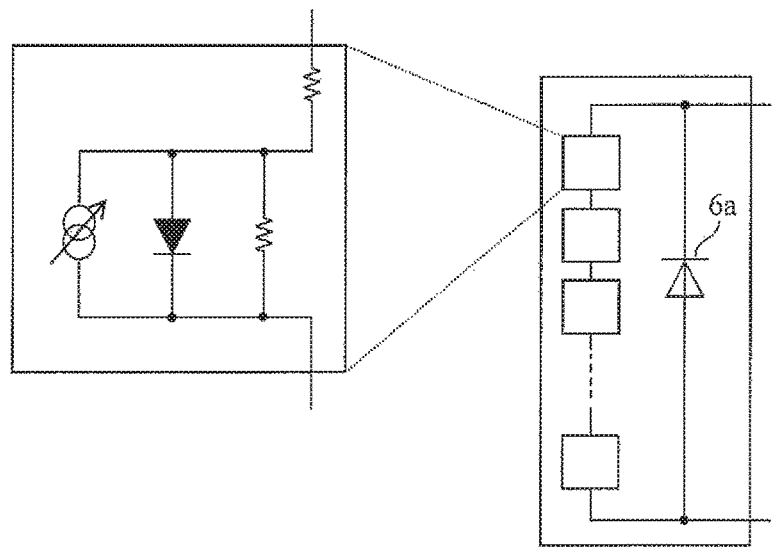
FIG. 6A illustrates a main factor in an equivalent circuit of a solar battery in the event of disconnection according to an embodiment of the present invention.

FIG. 6A illustrates equivalent circuit parameters in the case of disconnection failure mode. In the case of disconnection, the bypass diode 6a is placed in a constantly operating state. In this case, because the loss is dependent on the ratio of the number of valid cells, the loss has the same value regardless of the amount of solar radiation.

Figure 6B:
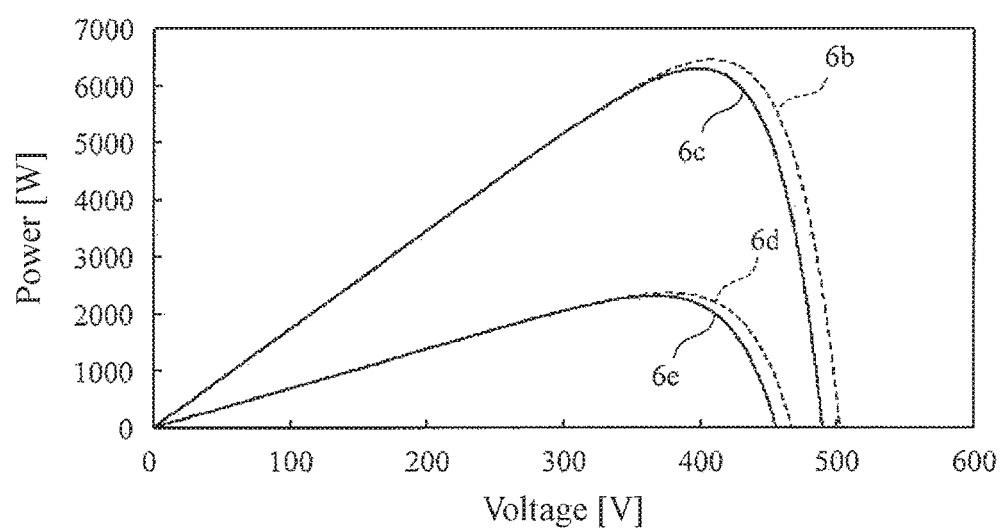
FIG. 6B illustrates a change in solar battery string characteristics in the event of disconnection.

FIG. 6B illustrates the loss (example) in the case of disconnection. While a string normally has the characteristics indicated by a power-voltage curve 6b when the amount of solar radiation is 1.0 kW/m$^2$, the characteristics are changed to those indicated by a power-voltage curve 6c when disconnection is caused in the string. In this case, the amount of loss is 2.2%. Meanwhile, while a string that normally has the characteristics indicated by a power-voltage curve 6d when the amount of solar radiation is 0.4 kW/m$^2$, the characteristics are changed to those indicated by a power-voltage curve 6e when disconnection is caused in the string, where the amount of loss is 2.4%, which can be considered to be practically the same value.

According to the embodiment of the present invention, failure diagnosis is performed by utilizing the property that the change in loss with respect to the amount of solar radiation varies depending on the failure modes illustrated in FIGS. 4 to 6.

<Configuration of Large Photovoltaic Power Generation Plant>

Figure 7:
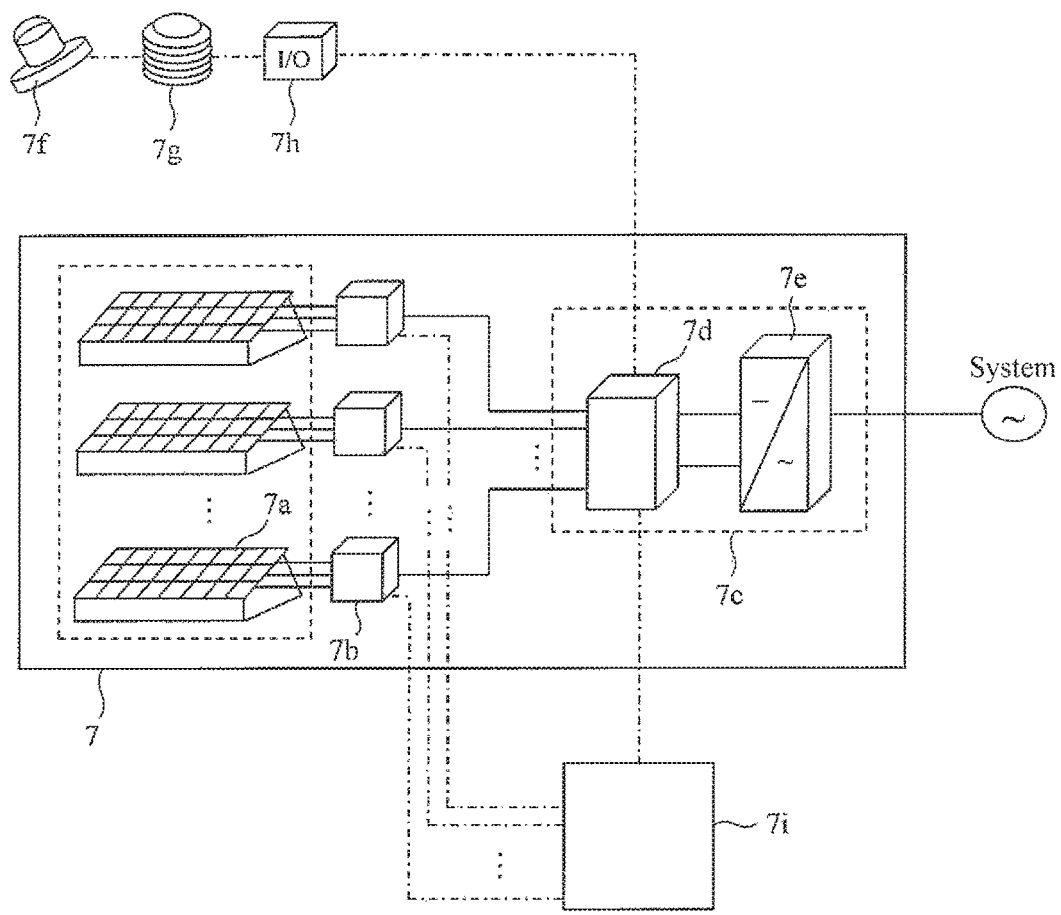
FIG. 7 illustrates a configuration example of a large photovoltaic power generation plant according to an embodiment of the present invention.

FIG. 7 illustrates a configuration example of a large photovoltaic power generation plant (photovoltaic power generation system). The large photovoltaic power generation plant 7 includes a plurality of solar battery string groups 7a, a plurality of connection boxes 7b, and a power conditioner (can be called as a PCS or a PV inverter hereinafter) 7c. Electric power from each of the string groups 7a is transmitted via the plurality of connection boxes 7b to the power conditioner 7c. The power conditioner 7c comprises a power collection rack 7d serving for power collection and as a DC/DC converter, and an AC/DC inverter 7e. Control for acquiring the maximum electric power from the plurality of solar battery string groups 7a connected to the power collection rack 7d is referred to as MPPT (Maximum Power Point Tracking) control. The MPPT control is implemented using direct-current electric power measured by an ammeter and a voltmeter in the DC/DC converter 7d. The DC/DC converter 7d, which is a direct-current boosting converter, boosts and supplies the direct-current voltage from the solar battery array to the AC/DC inverter 7e. Accordingly, converted alternating-current voltage and alternating current are interconnected with the system.

At the large photovoltaic power generation plant 7, a solar radiation meter 7f and an atmospheric thermometer 7g are installed, and their outputs are converted by a converter 7h into current signals of 4 to 20 mA which are transmitted to the power conditioner 7c. The power conditioner 7c transmits synchronized direct current and direct-current voltage, the amount of solar radiation (current value), and an atmospheric temperature (current value) to the monitor device 7i.

A measurement device is installed in each connection box 7b. A direct current and a direct-current voltage measured for each string are transmitted via a transmission path to the monitor device 7i. Thus, in the monitor device 7i, there is consolidated information about the amount of solar radiation and atmospheric temperature at the large photovoltaic power generation plant, the direct-current voltage and direct current of the solar battery array, and the direct current and direct-current voltage of each string.

<Configuration of Solar Array>

Figure 8:
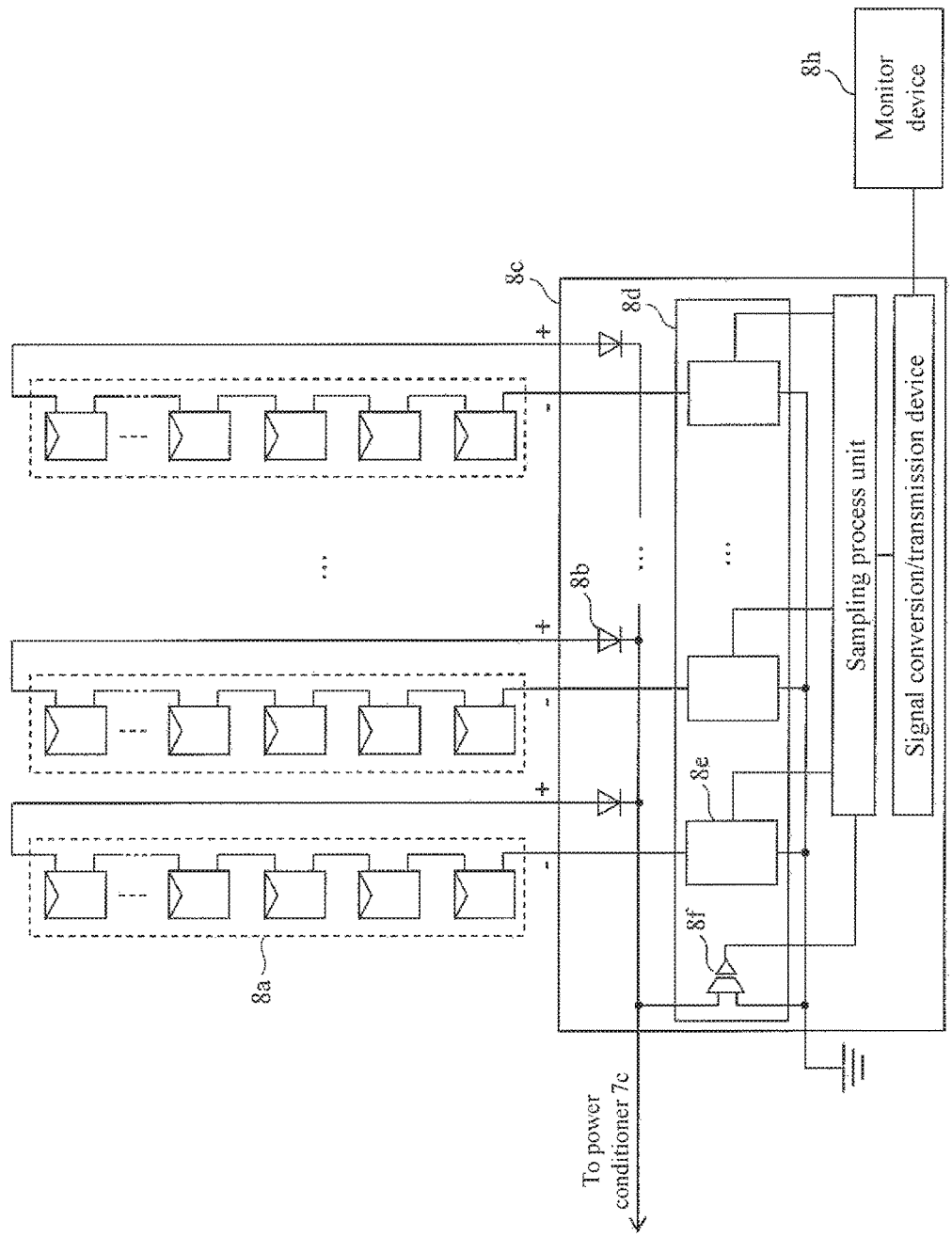
FIG. 8 illustrates a circuit configuration example for monitoring solar battery string characteristics in a connection box of a solar power generation system according to an embodiment of the present invention.

FIG. 8 illustrates a configuration example of a solar battery array. The solar array comprises solar battery strings 8a connected in parallel in a connection box 8c. Each string is provided with a back flow preventing diode 8b for preventing a current flow in the opposite direction. In the connection box 8c (corresponding to 7b in FIG. 7), a string measurement device 8d is installed.

The string measurement device 8d comprises a string current measurement device 8e for measuring a direct current that flows through each string, and a voltage measurement device 8f for measuring a direct-current voltage. The direct current and direct-current voltage of each string measured by the voltage measurement device 8f are subjected to a sampling-process in a sampling process unit and to parallel-serial conversion by a signal conversion/transmission device, before being transmitted to a monitor device 8h (corresponding to 7i in FIG. 8).

<Configuration Example of String Current Measurement Device>

Figure 9:
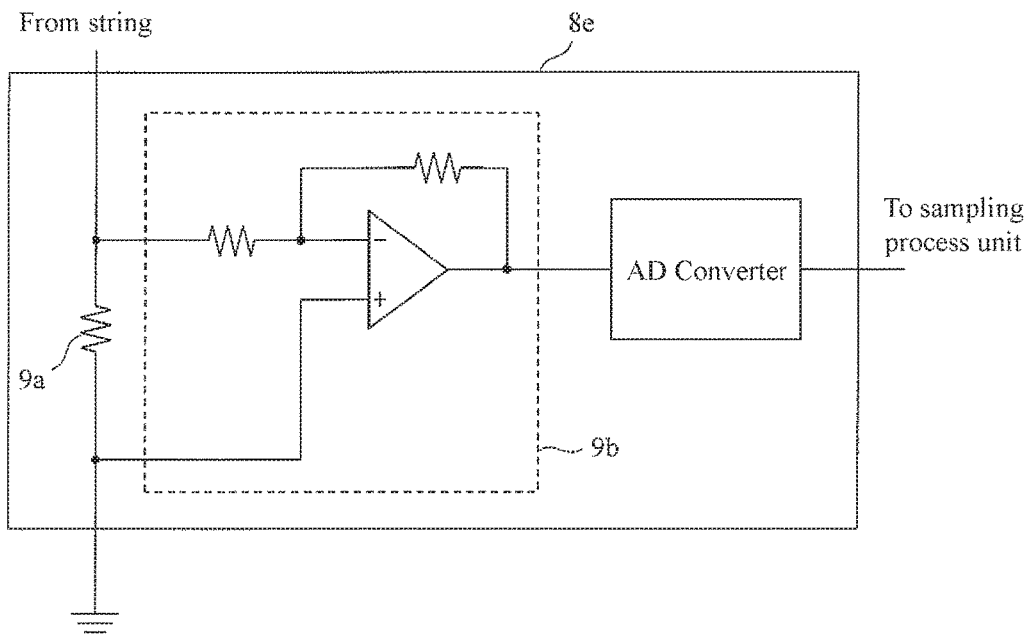
FIG. 9 illustrates a circuit configuration example for detecting current flow through a solar battery string according to an embodiment of the present invention.

FIG. 9 illustrates a configuration example of the string current measurement device 8e. The string current measurement device 8e includes a detection resistor 9a, an inverting-amplifier circuit 9b, and an AD converter.

The detection resistor 9a converts a current flowing through the string into a voltage. The inverting-amplifier circuit 9b amplifies a voltage signal of the voltage converted by the detection resistor 9a to a level that can be processed by the AD converter. The AD converter includes a low-pass filter which removes ripple components and high frequency components such as thermal noise of the detection resistor.

Figure 10:
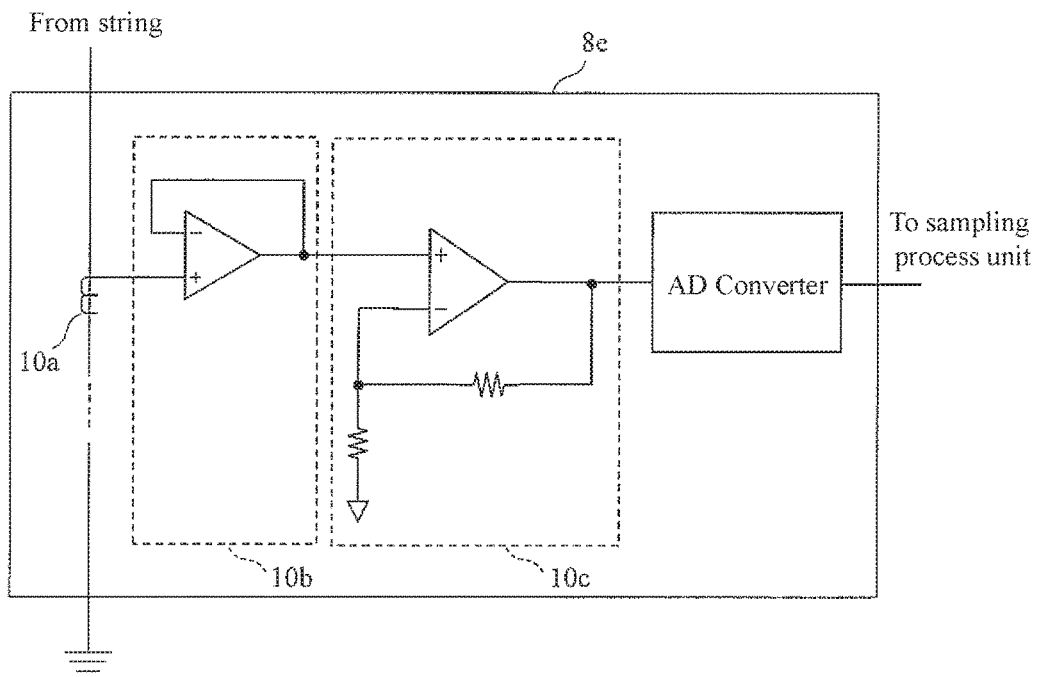
FIG. 10 illustrates another circuit configuration example for detecting current flow through a solar battery string according to an embodiment of the present invention.

FIG. 10 illustrates another configuration example of the string current measurement device 8e. The string current measurement device 8e includes a CT sensor 10a, a buffer circuit 10b, a non-inverting amplifier circuit 10c, and an AD converter. The CT sensor 10a converts a current flowing through the string into a voltage. The buffer circuit 10b converts the impedance of the voltage obtained by the conversion. The non-inverting amplifier circuit amplifies a voltage signal to a level that can be processed by the AD converter. As in FIG. 9, the AD converter may include a low-pass filter.

<Configuration of Monitor Device>

Figure 11:
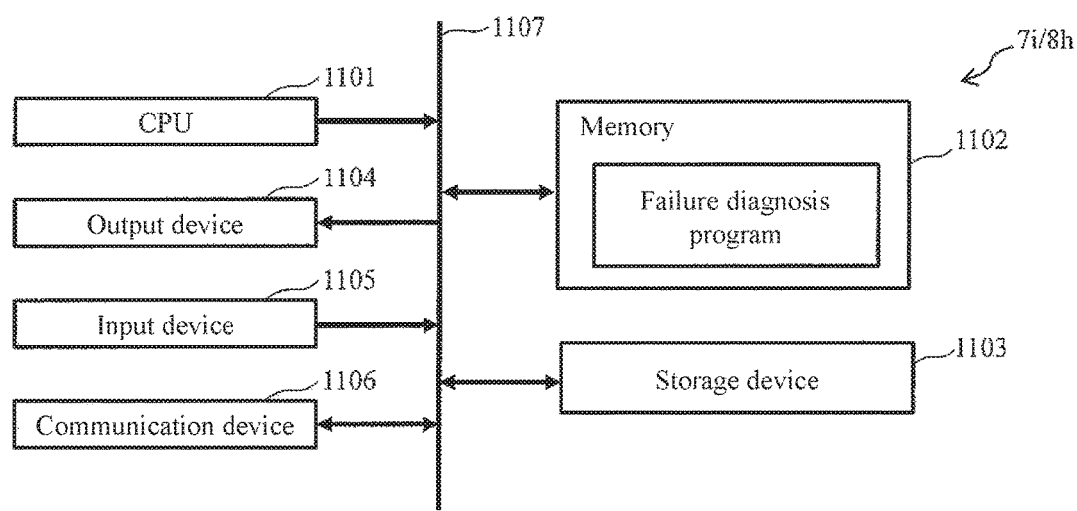
FIG. 11 illustrates a hardware configuration example of a monitor device according to an embodiment of the present invention.

FIG. 11 illustrates a hardware configuration example of the monitor device 7i (8h in FIG. 8). The monitor device 7i comprises a conventional computer and includes a processor 1101, such as a CPU, for executing various programs; a memory 1102 for storing various programs; a storage device 1103 for storing necessary parameters, data, measurement values and the like; an output device 1104 that outputs a computation result and the like; an input device 1105 for inputting operator instructions or data; and a communication device 1106 serving as an interface for communication. The various devices are connected via a bus 1107. The output device 1104 may include a display, a printer, a speaker and the like. The input device 1105 may include a keyboard, a mouse, a touch panel and the like.

The memory 1102 stores at least a failure diagnosis program (programs of FIG. 13 and FIG. 14, or a program of FIG. 16), which will be described below.

<Principle of Failure Diagnosis for Solar Power Generation System>

In the following, with regard to the failure diagnosis method for a solar power generation system according to an embodiment of the present invention, a method for calculating the amount of solar radiation per unit area (solar radiation intensity being irradiated onto the solar battery array) and the solar battery operation temperature will be described. The amount of solar radiation per unit area and the solar battery operation temperature are calculated from the measurement values (current and voltage measurement values of the solar array) in the power conditioner 7c. In the present specification, with reference to a solar battery, the current at zero voltage, i.e., when short-circuited, will be referred to as a short-circuit current; the voltage at zero current, i.e., when opened, will be referred to as an open-circuit voltage; and the current and voltage at the operating point where the maximum electric power can be taken out will be referred to as a maximum operation current and a maximum operation voltage, respectively.

The present inventors, before arriving at the concept of the present invention, evaluated hundreds of thousands of 100 to 200 W-class solar battery modules constituting large-scale solar power generation systems. The results of the evaluations led the present inventors to the realization that operation current and short-circuit current have a very high correlation regardless of the manufacturing variations or type of the solar battery modules. The present inventors have also found that the ratio J of operation current and short-circuit current (=operation current/short-circuit current) that is determined for each solar battery module is maintained nearly constant in the solar radiation amount range of 0.1 to 1.0 kW/m$^2$ in which MPPT control is implemented and in practical temperature ranges. Namely, J is constant even when the solar battery module is degraded. In the present specification, the ratio J of operation current and short-circuit current may be referred to as a predetermined coefficient.

Based on the relationship between operation current and short-circuit current that has been discovered as described above, operations are performed by CPU 1101 as will be described below, and an ideal value of string power is calculated.

When the measured maximum operation current is Ipmax_b, the amount of solar radiation in standard state is 1.0 kW/m$^2$, the short-circuit current and the maximum operation current at 25° C. are respectively defined as Isc_0 and Ipmax_0, and the operation temperature is Tb, the amount of solar radiation pb can be calculated according to Expressions (1) to (3) using a temperature coefficient α for short-circuit current.

$$J = I_{pmax\_0}/I_{sc\_0} \quad (1)$$

$$I_{sc\_0}[Tb] = I_{sc\_0} + \alpha \cdot (Tb - 25) \quad (2)$$

$$pb = (I_{pmax\_b}/J)/I_{sc\_0}[Tb] \quad (3)$$

In terms of the unit of the solar battery arrays consolidated in the power conditioner 7c, and from the viewpoint of finding a solar battery string having a failed solar battery module early, it may fairly be considered that the ratio J of operation current and short-circuit current on a solar battery array unit basis is also maintained constant.

From the above relationship, in the failure diagnosis method according to an embodiment of the present invention, first, the expected amount of solar radiation is calculated using the ratio J of operation current and short-circuit current in the solar battery array unit basis that is measured in the power conditioner 7c. Then, using the operation voltage in the solar battery array unit basis that is measured in the power conditioner 7c, an expected operation temperature of the operation temperature of the solar battery array is calculated. By utilizing the expected amount of solar radiation and the expected temperature that have been calculated, failure diagnosis is performed on a string by string basis.

Using the parameters of I: output current [A], Is: reverse saturation current [A], V: output voltage [V], Isc: short-circuit current [A], T: solar battery element absolute temperature [K], k: Boltzman's constant [J/K], Rs: wiring resistance [Ω], q: electric charge of electrons [C], Rsh: shunt resistance [Ω], nf: junction constant, and p: the amount of solar radiation [kW/m$^2$], the expression for calculating the output electric power of the solar battery module 2g comprising N cells can be represented by Expression (4).

$$I = Isc \cdot p - Is \cdot \{\exp(q \cdot (V/(Ncell) + Rs \cdot I)/(nf \cdot k \cdot T))\} - (V/(Ncell) + Rs \cdot I)/Rsh \quad (4)$$

In the following, a method for calculating the current-voltage characteristics of the solar battery array using Expression (4) for calculating output voltage with respect to one module will be described. In the present specification, the calculation for the array will be referred to as array operation. The array operation is implemented by a combination of string analysis and array analysis.

When string analysis is performed, a common current flows through a plurality of modules. Accordingly, the string voltage can be calculated by determining the module voltages V[1], V[2], V[3], . . . V[N−1], and V[N] of the respective solar batteries in the presence of a certain current I flow according to Expression (4), and then determining their sum Vstring. When the voltage is computed according to Expression (4), the voltage can be easily determined by applying a repetitive operation such as Newton's method, although being an inverse function. If the module has solder peeling or disconnection, the voltage decreases compared with the module voltage in normal time; in the case of disconnection, the voltage is considered to be effectively 0 because the bypass diode functions.

On the other hand, when array analysis is performed, a plurality of strings has a common voltage. Accordingly, the string current can be calculated by determining the currents: I[1], I[2], . . . I[N] that are taken out from the respective strings when a certain voltage V is being applied, according to Expression (4), and then determining their sum Iarray. Namely, the array operation is an operation for determining the current-voltage characteristics of the solar battery array on the basis of a combination of string analysis and array analysis.

Further, in the failure diagnosis method according to the present embodiment, the operation temperature (expected temperature) is also calculated only from the maximum operation current Ipmax_b and maximum operation voltage Vpmax_b measured in the power conditioner. Normally, the operation temperature is measured by a temperature sensor (using a thermocouple) attached to the back of the array. However, the measurement accuracy of the temperature sensor is generally low. Accordingly, in the present embodiment, the operation temperature Tb is determined by arithmetic operation. Herein, using a temperature coefficient β[V/° C.] for open-circuit voltage, the open-circuit voltage Voc_b of the solar battery array can be expressed by Expression (5).

$$Voc\_b = Voc\_a + \beta \cdot (Tb - Ta) \quad (5)$$

where Voc_a is the open-circuit voltage at normal temperature Ta.

Then, using the above-described coefficient J, Ipmax_b can be expressed by Expression (6) similarly under the condition of the operation temperature Tb.

$$Ipmax\_b = J \cdot Isc\_b \cdot p \quad (6)$$

where Isc_b is the short-circuit current at the operation temperature Tb and the amount of solar radiation 1.0 kW/m$^2$, and is a value determined by Expression (2).

In addition, the operation voltage Vpmax_b and the open-circuit voltage Voc_b are respectively expressed by Expression (7) and Expression (8).

$$Vpmax\_b = Ncell \cdot (nf \cdot k \cdot Tb)/q \cdot \ln\{(Isc\_b \cdot pb - Ipmax\_b)/Is\} \quad (7)$$

$$Voc\_b = Ncell \cdot (nf \cdot k \cdot Tb)/q \cdot \ln\{(Isc\_b \cdot pb)/Is\} \quad (8)$$

Combining Expression (7) and Expression (8), we have Expression (9).

$$Vpmax\_b - Voc\_b = Ncell \cdot ((nf \cdot k \cdot Tb)/q) \cdot \ln(1 - J) \quad (9)$$

Substituting Expression (5) into Expression (9), we have Expression (10).

$$Tb = (Vpmax\_b - Voc\_a - \beta \cdot Ta)/Ncell \cdot (nf \cdot k/q) \cdot \ln(1 - J) + \beta) \quad (10)$$

Accordingly, by solving the linear equation given by Expression (10), the solar battery array operation temperature Tb (=expected temperature) can be calculated from the operation voltage Vpmax_b measured in the power conditioner and the open-circuit voltage at normal temperature.

<Selection of Data Used for Failure Diagnosis>

Figure 12:
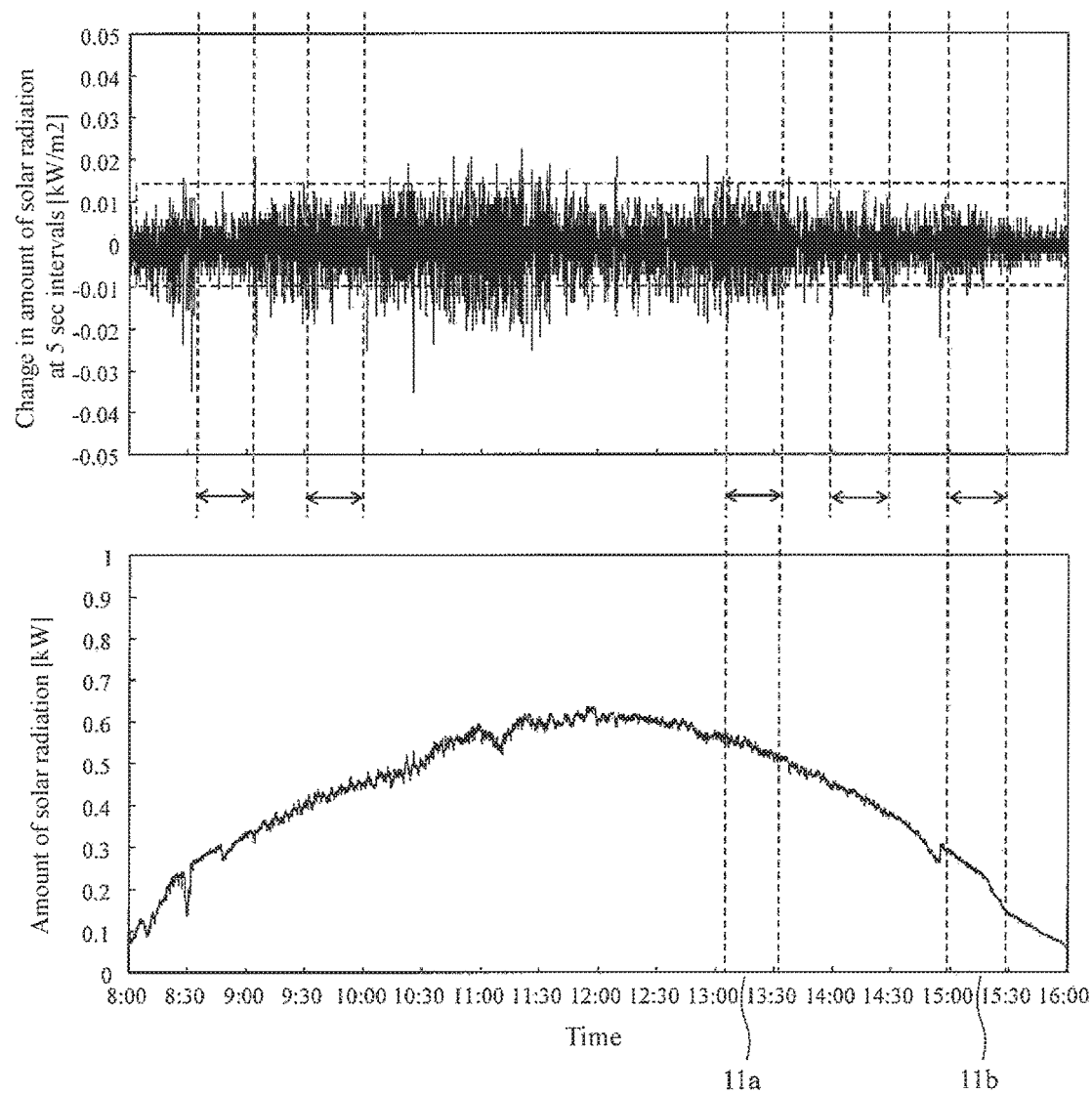
FIG. 12 illustrates a solar radiation change and temporal transition in the amount of solar radiation (example) at predetermined time intervals in a day at a large photovoltaic power generation plant according to an embodiment of the present invention.

FIG. 12 illustrates the change in solar radiation and the amount of temporal transition of solar radiation at predetermined time intervals in a day at the large photovoltaic power generation plant. Specifically, FIG. 12 shows the observed values of the amount of change in solar radiation and the amount of solar radiation at five-second intervals on a sunny day. Herein, with reference to FIG. 12, a method for determining the stability of solar radiation and a method for selecting two time bands will be described.

According to the present embodiment, a stable time band is defined as a state in which the state of the amount of change in solar radiation (absolute value) at five-second intervals being smaller than 0.015 kW/m$^2$ continues for 30 minutes. In FIG. 12, five stable time bands are selected. Among the selected time bands, the time band with the greatest amount of solar radiation is defined as the time band of start time (1), while the time band with the smallest amount of solar radiation is defined as the time band of start time (2). If the difference in the average amount of solar radiation between the time band of start time (1) and the time band of start time (2) is smaller than a predetermined value, failure diagnosis is not performed: failure diagnosis is performed only when the difference is greater than the predetermined value. Also, failure diagnosis is not performed if two or more stable time bands could not be acquired in the day (for example, on a rainy day). According to the embodiment of the present invention, failure diagnosis is performed after the operation of the large photovoltaic power generation plant for the day has been completed.

<Failure Diagnosis Process for Solar Battery String>

Figure 13:
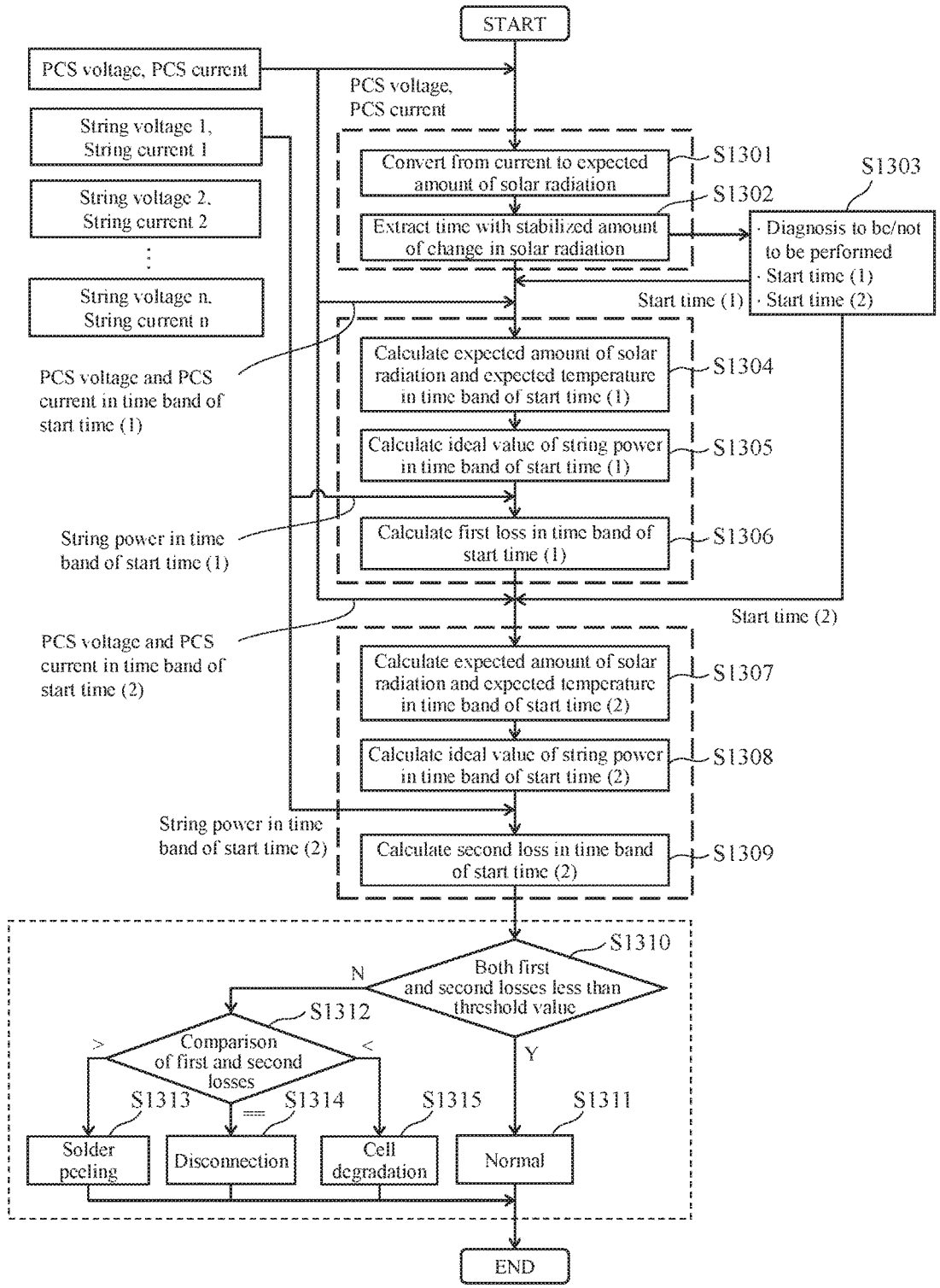
FIG. 13 is a flowchart for describing a failure determination process for a solar battery string according to a first embodiment of the present invention.

FIG. 13 is a flowchart for describing a failure diagnosis process for the solar battery string according to the first embodiment of the present invention. In the failure diagnosis process, the relationship between solar radiation and loss in each failure mode, the configuration of the large photovoltaic power plant, and calculation formulas are used. As a precondition for performing the failure diagnosis process, it is necessary that the measurement voltage and measurement current (PCS voltage and PCS current) of the solar battery array, and the measurement voltage and current (string voltages 1 to n, and string currents 1 to n) of each solar battery string have been acquired.

(i) Step 1301

The CPU 1101 of the monitor device 7i calculates, using Expressions (1) to (3), the amount of solar radiation (expected amount of solar radiation) being irradiated onto the solar battery array, from the PCS current measured in the power conditioner 7c (hereafter referred to as PCS: Power Conditioner System).

(ii) Step 1302

The CPU 1101 extracts a time band with a stabilized amount of change in solar radiation according to the method described with reference to FIG. 12.

(iii) Step 1303

The CPU 1101, using the expected amount of solar radiation calculated in step 1301, determines whether failure diagnosis should be performed. For example, it is determined that the failure diagnosis process should not be performed when the expected amount of solar radiation is smaller than the predetermined value; when the difference between the average amount of solar radiation of the time band of start time (1) and the average amount of solar radiation of the time band of start time (2) is smaller than a predetermined amount of solar radiation (predetermined threshold value); or when the number of the time bands with a stabilized amount of change in solar radiation that were extracted in step 1302 is less than two, and the process ends.

The CPU 1101 also sets, from among the time bands with stabilized amount of change in solar radiation that were extracted in step 1302, the time band with the maximum amount of solar radiation as the time band of start time (1), and the time band of the minimum amount of solar radiation as the time band of start time (2).

(iv) Step 1304

The CPU 1101 calculates the operation temperature (expected temperature) of the solar battery array at the start time (1), and performs temperature correction for the expected amount of solar radiation. The details of the process of step 1304 will be described later with reference to FIG. 14.

(v) Step 1305

After the expected amount of solar radiation (corrected value) and the expected temperature at the time band of start time (1) are calculated in step 1304, the CPU 1101 calculates an ideal value of string power at the expected amount of solar radiation and expected temperature. More specifically, the Expression (4) for determining the output current with respect to the solar battery module is converted for the solar battery string (the number of cells Ncell in Expression (4) becomes the number of cells in the string), the expected electric power value is calculated using the expression and the expected current value calculated in step 1304, and the string power (ideal value) is determined.

(vi) Step 1306

The CPU 1101 calculates a first loss at the start time (1). The first loss is a value (%) indicating how much the actual measurement value of the string power is decreased compared with the ideal value.

(vii) Step 1307

The CPU 1101 calculates the operation temperature (expected temperature) of the solar battery array at the start time (2), and performs temperature correction for the expected amount of solar radiation. The details of the process of step 1307 will be described with reference to FIG. 14, as in the case of step 1304.

(viii) Step 1308

After the expected amount of solar radiation (corrected value) and expected temperature in the time band of start time (2) are calculated in step 1307, the CPU 1101 calculates an ideal value of string power at the expected amount of solar radiation and expected temperature. More specifically, Expression (4) for determining the output current with respect to the solar battery module is converted for the solar battery string (the number of cells Ncell in Expression (4) becomes the number of cells in the string), the expected electric power value is calculated using the expression and the expected current value calculated in the step 1304, and the string power (ideal value) is determined.

(ix) Step 1309

The CPU 1101 calculates a second loss at the start time (2). The second loss is also a value (%) indicating how much the actual measurement value of string power is decreased compared with the ideal value.

(x) Step 1310

The CPU 1101 determines whether the first loss and second loss have reached a pre-set threshold value for failure determination. If both the first loss and second loss are smaller than the threshold value (Yes in step 1310), the process transitions to step 1311. If either is not smaller than the threshold value (No in step 1310), the process transitions to step 1312. The threshold value for failure determination is set, for example, to 1/N (%) where N is the number of cells included in the solar battery string, so that even one cell that has failed can be detected. When N=42 (14 modules, 42 cells), the threshold value may be set to 2.4%.

Thus, a feature of the embodiment of the present invention is that time bands with stabilized amount of change in sunlight are selected, whereby failure can be detected even when the loss is several %.

(xi) Step 1311

Because both the first loss and second loss are smaller than the threshold value, the CPU 1101 determines that the string to be inspected is normal.

(xii) Step 1312

The CPU 1101 compares the first loss and the second loss. If the first loss is greater than the second loss (their difference being not within a predetermined range), the process transitions to step 1313. If the first loss and the second loss are nearly the same (their difference being within the predetermined range), the process transitions to step 1314. If the first loss is smaller than the second loss (their difference being not within the predetermined range), the process transitions to step 1315.

(xiii) Step 1313

The CPU 1101 determines that the string of concern includes a cell having "solder peeling".

(xiv) Step 1314

The CPU 1101 determines that the string of concern includes a cell having "disconnection".

(xv) Step 1315

The CPU 1101 determines that the string of concern includes a cell having "cell degradation".

By performing the above process to all of the strings, it becomes possible to determine degradation or failure of a solar battery string with high accuracy and to make a failure factor diagnosis while accurately tracking the amount of solar radiation irradiated onto the solar battery and the operation temperature in the solar power generation system. In other words, it can be detected which string includes the cell having a failure and what the failure is. However, the present invention does not go so far as to identify which cell is having the failure.

<Details of Steps 1304 and 1307>

Figure 14:
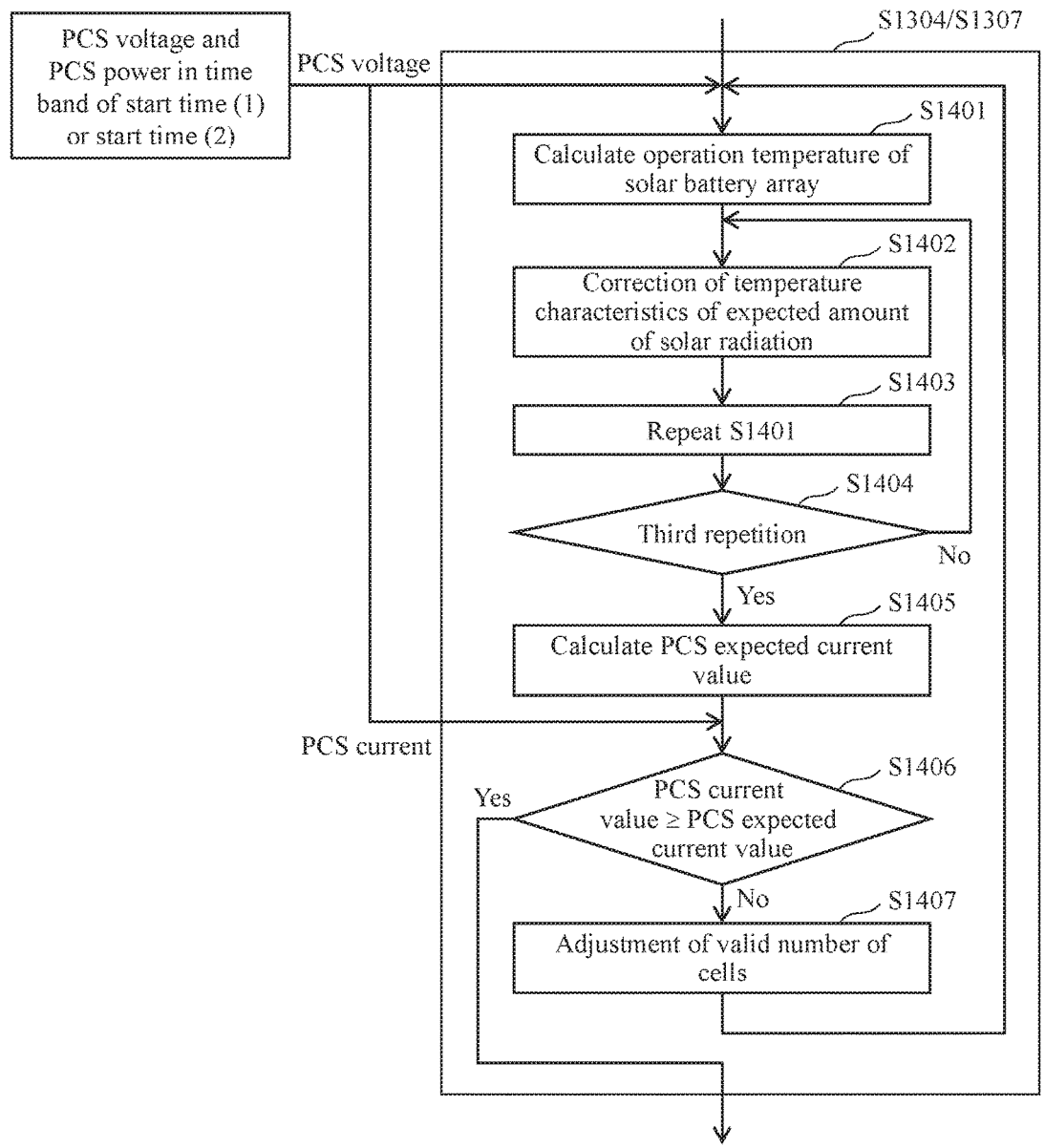
FIG. 14 is a flowchart for describing the details of a process (steps 1304 and 1307) of calculating the amount of solar radiation irradiated onto a solar battery array and operation temperature according to the first embodiment of the present invention.

FIG. 14 is a flowchart for describing the details of the processes of steps 1304 and 1307.

(i) Step 1401

The CPU 1101 computes the operation temperature (expected temperature) from the PCS voltage, using Expressions (5) to (10).

(ii) Step 1402

The CPU 1101, using Expressions (2) and (3), performs temperature correction for the expected amount of solar radiation.

(iii) Step 1403

The CPU 1101 repeats the computation of step 1401; i.e., computes the operation temperature (expected temperature) again, using Expressions (5) to (10).

(iv) Step 1404

The CPU 1101 determines if the computation of the operation temperature (step 1401) has been performed three times. This is because the expected amount of solar radiation and the expected temperature will each converge when the computation of step 1401 is repeated about three times. As long as the values of the expected temperature and the like can converge, the number of times of repetition may not be three. If the number of times of repetition has reached three (Yes in step 1404), the process transitions to step 1405. If the number of times of repetition has not reached three (No in step 1404), the process transitions to step 1402.

(v) Step 1405

The CPU 1101 calculates a current value at the expected amount of solar radiation and expected temperature obtained in steps 1401 to 1404, according to Expression (4) and by the array operation. Herein, the calculated current value will be referred to as a PCS expected current value.

(vi) Step 1406

The CPU 1101 determines whether the PCS current value (measurement value) is equal to or greater than the PCS expected current value calculated in step 1405. If the PCS current value (measurement value) is equal to or greater than the PCS expected current value (Yes in step 1406), the process transitions to step 1305 (FIG. 13). If the PCS current value (measurement value) is smaller than the PCS expected current value (No in step 1406), the process transitions to step 1407.

(vii) Step 1407

The CPU 1101 adjusts the valid number of cells in the string to be inspected. The embodiment of the present invention is based on the premise that the influence of a decrease in output of the solar battery module 2g on the solar battery arrays consolidated in the power conditioner 7c is low. However, when a solar battery module 2g has disconnection failure, for example, the operation of a number of solar battery cells 2f will become invalid, resulting in an increased change in the characteristics of the solar battery module 2g. Accordingly, when the PCS expected current value at the expected temperature is greater than the measured PCS current value, the adjustment of the valid number of cells is performed. Namely, based on the assumption that there is cell failure, the computation of the operation temperature (expected temperature) is repeated until the PCS current value (measurement value) becomes equal to or greater than the PCS expected current value.

After the valid number of cells is adjusted, the process transitions to step 1401.

<Configuration Example of GUI>

FIG. 15 illustrates a configuration example of a GUI (Graphical User Interface) according to the first embodiment of the present invention.

When a failure is discovered by the failure diagnosis process, a diagnostic result (see FIG. 15A) is displayed on a display screen of the monitor device 7i. In the example of FIG. 15A, the diagnostic result being displayed indicate that failure has been detected in the two strings of solar battery strings 1 and 2. It is also specified that the factor of failure is "disconnection" for string 1 and "solder peeling" for string 2. When "5 sec data display" is clicked, the data for the time bands of start time (1) and start time (2) are displayed side by side, as illustrated in FIG. 15B. Namely, the user is presented with the data actually used for the failure diagnosis. Accordingly, the user can analyze the detected failure in detail.

(B) Second Embodiment

According to the second embodiment, failure diagnosis for the solar battery string is performed by a simple comparison of a reference current determined from the solar radiation amount measurement value and the PCS current value (measurement value) with the current value (measurement value) of each string. The second embodiment is similar to the first embodiment (such as the solar power generation system, the configurations of the other devices and circuits, and the GUI) with the exception of the portions that will be described below.

Figure 16:
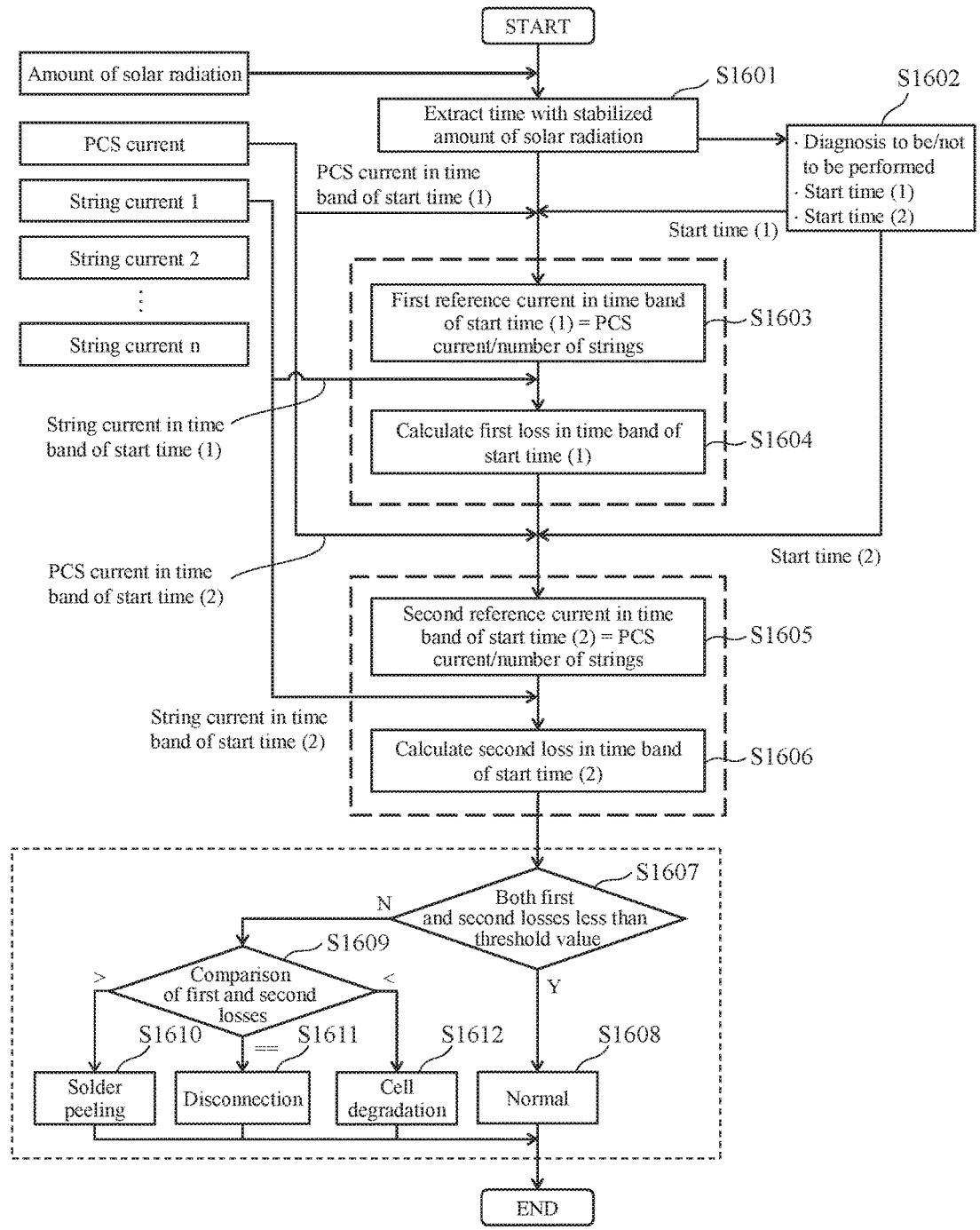
FIG. 16 is a flowchart for describing a failure determination process for a solar battery string according to a second embodiment of the present invention.

FIG. 16 is a flowchart for describing a failure diagnosis process for the solar battery string according to the second embodiment of the present invention.

(i) Step 1601

The CPU 1101, using the amount of solar radiation measured by the solar radiation meter 7f, extracts times with stable solar radiation amounts by the method described with reference to FIG. 12.

(ii) Step 1602

The CPU 1101 determines whether failure diagnosis should be performed, based on the expected amount of solar radiation calculated in step 1601. For example, it is determined that the failure diagnosis process should not be executed and the process ends if the expected amount of solar radiation is smaller than a predetermined value; if the difference between the average amount of solar radiation in the time band of start time (1) and the average amount of solar radiation in the time band of start time (2) is smaller than a predetermined amount of solar radiation (predetermined threshold value); or if the number of the time bands with stabilized amount of change in solar radiation extracted in step 1602 is smaller than two.

The CPU 1101 sets, from among the time bands with stabilized amount of change in solar radiation extracted in step 1602, the time band with the maximum amount of solar radiation as the time band of start time (1), and the time band with the minimum amount of solar radiation as the time band of start time (2).

(iii) Step 1603

The CPU 1101 calculates a first reference current by dividing the PCS current value measured in the time band of start time (1) by the number of strings constituting the solar battery array.

(iv) Step 1604

The CPU 1101 compares the first reference current with the string current measured in the solar battery string to be inspected, and calculates the first loss in the time band of start time (1). The loss is a value (%) indicating, as in the first embodiment, how much the actual string current is decreased from the reference (corresponding to the first reference current).

(v) Step 1605

The CPU 1101 calculates a second reference current by dividing the PCS current value measured in the time band of start time (2) by the number of strings constituting the solar battery array.

(vi) Step 1606

The CPU 1101 compares the second reference current with the string current measured in the solar battery string to be inspected, and calculates the second loss in the time band of start time (2).

(vii) Step 1607

The CPU 1101 performs a string failure diagnosis using the calculated first loss and second loss. Namely, the CPU 1101 determines whether both the first loss and second loss are equal to or greater than a failure threshold value. If both the first loss and second loss are smaller than the failure threshold value (Yes in step 1607), the process transitions to step 1608. If the first loss and/or the second loss is equal to or greater than the failure threshold value (No in step 1607), the process transitions to step 1609.

(viii) Step 1608

Because both the first loss and second loss are smaller than the threshold value, the CPU 1101 determines that the string to be inspected is normal.

(ix) Step 1609

The CPU 1101 compares the first loss and the second loss. If the first loss is greater than the second loss (their difference being not within a predetermined range), the process transitions to step 1610. If the first loss and the second loss are nearly the same (their difference being within the predetermined range), the process transitions to step 1611. If the first loss is smaller than the second loss (their difference being not within the predetermined range), the process transitions to step 1612.

(x) Step 1610

The CPU 1101 determines that the string of concern includes a cell having "solder peeling".

(xi) Step 1611

The CPU 1101 determines that the string of concern includes a cell having "disconnection".

(xii) Step 1612

The CPU 1101 determines that the string of concern includes a cell having "cell degradation".

By performing the above processes for all of the strings, it becomes possible to highly accurately determine degradation or failure of a solar battery string and also make a failure factor diagnosis in a solar power generation system while accurately tracking the amount of solar radiation being irradiated onto the solar battery and the operation temperature. Namely, it can be detected which string includes a cell having a failure and what the failure is. However, the present invention does not go so far as to detect which cell has failed.

(C) Conclusion (i) According to the first embodiment, a monitor device (computer) first acquires information about the amount of change in solar radiation in each of predetermined time bands in a day, and extracts, from among predetermined time bands of which the amount of change in solar radiation is smaller than a predetermined amount of change in solar radiation (at 30 minutes intervals), a first time band indicating a minimum amount of solar radiation and a second time band indicating a maximum amount of solar radiation. Then, the monitor device, using a ratio of operation current and short-circuit current ("J" in the above-described expressions) in a solar battery array, calculates (using Expression (4)) an expected electric power value of the solar battery string to be inspected in each of the first and second time bands. Further, the monitor device calculates, in the first and second time bands and from a measurement electric power value of the solar battery string to be inspected and the expected electric power value in the first time band and the expected electric power value in the second time band, a first electric power loss in the first time band and a second electric power loss in the second time band (for example, the absolute value of ((expected electric power value−measurement electric power value)/expected electric power value) provides the loss (%)). The monitor device then detects failure in the solar battery string to be inspected, based on the first and second electric power losses. Specifically, it is determined that the solar battery string to be inspected has failure if either the first or second electric power loss is equal to or greater than a predetermined failure determination threshold value (see step 1310). The failure determination threshold value is set to a value such that electric power loss can be sensed when one of a plurality of cells constituting the solar battery module of the solar battery string has failed. In this way, a failure can be accurately sensed even in the presence of a slight electric power loss that would normally not be determined to be a failure.

The monitor device also identifies a factor of failure in accordance with the result of comparison the magnitude of the first electric power loss and the second electric power loss. Specifically, the monitor device determines that there is solder peeling if the first electric power loss is greater than the second electric power loss; disconnection if the first electric power loss is nearly equal to the second electric power loss; or cell degradation if the first electric power loss is smaller than the second electric power loss. In this way, even the factor of failure can be identified, so that the effect can be expected that a maintenance plan for the solar power generation system can be more easily devised.

Further, the monitor device validates a diagnosis if a difference between the average amount of solar radiation in the first time band and the average amount of solar radiation in the second time band exceeds a threshold value of a predetermined amount of solar radiation. By thus determining whether the day is suitable for making a diagnosis, the accuracy of the diagnostic result can be increased and the system can be spared from the need to perform wasteful computations, whereby the resources can be effectively utilized.

Specifically, when the expected electric power value of each solar battery string to be inspected is calculated, the monitor device initially calculates the amount of solar radiation expected in the solar battery array (expected amount of solar radiation) and an operation temperature that is expected (expected operation temperature), based on data of a short-circuit current, an open-circuit voltage, an operation voltage, and an operation current in a reference state of the solar battery module, and from a ratio of the operation current and the short-circuit current in a solar battery array, and a measurement current (PCS current) and a measurement voltage (PCS voltage) of the solar battery array. The monitor device then, using the calculated expected amount of solar radiation and expected operation temperature, calculates an expected electric power value of the solar battery string. In this way, an electric power value (expected electric power value) obtained in an ideal state can be calculated from the relationship, discovered by the present inventors, of the "ratio of operation current and short-circuit current being nearly constant", and the measurement values. Accordingly, failure diagnosis can be performed easily by comparing the calculated value and the actually measured electric power value of each solar battery string (current value×voltage value), whereby the factor of failure can be identified.

(ii) According to the second embodiment, the monitor device, as in the first embodiment, acquires information about the amount of change in solar radiation in each of predetermined time bands in a day, and extracts, from among the predetermined time bands of which the amount of change in solar radiation is smaller than a predetermined amount of change in solar radiation, a first time band indicating a minimum amount of solar radiation and a second time band indicating a maximum amount of solar radiation. The monitor device, using a PCS current value of a solar battery array in the first and second time bands, calculates a reference current value for the solar battery string to be inspected in each of the first and second time bands. The reference current value is calculated by dividing the PCS current value by the number of strings. The monitor device also calculates a first loss in the first time band and a second loss in the second time band from a measurement current value of the solar battery string to be inspected in the first and second time bands and the reference current value for the first time band and the reference current value for the second time band (for example, the absolute value of (reference current value−string current value)/reference current value) provides the loss (%)). Based on the first and second losses, the monitor device detects failure in the solar battery string to be inspected. The factor of failure is identified similarly to the first embodiment.

(iii) The present invention may be implemented by software program code for implementing the functions of the embodiments. In this case, for example, a storage medium having the program code recorded therein is provided to a system or a device, and the program code stored in the storage medium is read by a computer (such as CPU or MPU) in the system or device. In this case, the functions of the embodiments are implemented by the program code per se that has been read from the storage medium, and the program code per se and the storage medium having the same stored therein constitute the present invention. Examples of the storage medium for supplying the program code include flexible discs, CD-ROMs, DVD-ROMs, hard disks, optical disks, magneto-optical disks, CD-Rs, magnetic tape, non-volatile memory cards, and ROMs.

Some or all of the actual processes may be performed by an OS (operating system) and the like running on a computer in accordance with program code instructions, so that the functions of the embodiments can be implemented by the processes. In addition, the program code read from the storage medium may be written to a memory in a computer, and some or all of the actual processes may be performed by the CPU and the like of the computer in accordance with the program code instructions, so that the functions of the above-described embodiments can be implemented by the processes.

Further, software program code for implementing the function of an embodiment may be delivered via a network, and stored in a storage means, such as a hard disk or memory of a system or device, or in a storage medium such as a CD-RW or a CD-R. At the time of use, the program code stored in the storage means or the storage medium may be read and executed by a computer (such as CPU or MPU) in the system or device.

Finally, it should be understood that the processes and technologies described herein are not inherently related to a particular device, and may be implemented by any appropriate combination of components. Further, various general-purpose devices may be used in accordance with the teachings described herein. It may prove convenient at times to construct a more specialized device to execute the method steps described herein. Various inventions may also be formed by appropriate combinations of a plurality of constituent elements disclosed in the embodiments. For example, some of the constituent elements indicated in an embodiment may be deleted, or constituent elements from different embodiments may be appropriately combined. While the present invention has been described with reference to specific examples, the examples are not intended to limit the invention but are illustrative in all aspects. Those skilled in the relevant art will recognize that there are a number of combinations of hardware, software, and firmware appropriate for implementing the present invention. For example, the described software may be implemented by a wide range of programs or script languages, such as assembler, C/C++, perl, Shell, PHP, and Java (registered trademark).

In the above-described embodiments, the control lines or information lines illustrated are only those considered to be necessary for description and do not necessarily represent all of the control lines or information lines found in a product. All of the configurations may be mutually connected.

In addition, other implementations of the present invention will become apparent to those skilled in the art when consideration is given to the specification and the embodiments disclosed herein. The various modes and/or components of the described embodiments may be used individually or in any combination. The specification and specific examples are merely exemplary, and the scope and spirit of the present invention are indicated by the following claims.

DESCRIPTION OF SYMBOLS 7 large photovoltaic power generation plant
7a Solar battery string groups
7b Connection box
7c Power conditioner
7d Power collection rack
7f Solar radiation meter
7g Atmospheric thermometer
7h Converter
7i Monitor device

What is claimed is:
1. A solar power generation system comprising:
a solar battery array comprising a plurality of solar battery strings connected in parallel, each solar battery string comprising a plurality of solar battery modules connected in series,
a plurality of string measurement units that, with a string current measurement device, measure a current and, with a voltage measurement device, measure a voltage of each of the plurality of solar battery strings;

a sampling process unit receiving input from each of the string current and voltage measurement devices, and supplying output to a signal conversion/transmission device; and a monitor device including a computer having a processor, a memory for storing programs, a storage device for storing necessary parameters, data, and measurement values, an output device, an input device, and a communication interface connecting the processor, the memory, the storage device, the output device, and the input device for communication, the computer configured to receive, via the communication interface, output from the signal conversion/transmission device permitting the processor to calculate an electric power loss of each of the plurality of solar battery strings and detect a failure in each solar battery string, wherein the input device acquires information about an amount of change in solar radiation in each of predetermined time bands in a day, and the processor extracts, from among the predetermined time bands of which the amount of change in solar radiation is smaller than a predetermined amount of change in solar radiation, a first time band indicating a minimum amount of solar radiation and a second time band indicating a maximum amount of solar radiation, the processor calculates, using a ratio of operation current and short-circuit current in the solar battery array, an expected electric power value of the solar battery string to be inspected in each of the first and second time bands, the processor calculates, from a measurement electric power value of the solar battery string to be inspected in the first and second time bands, the expected electric power value in the first time band, and the expected electric power value in the second time band, a first electric power loss in the first time band and a second electric power loss in the second time band, the processor detects, based on the first and second electric power losses, failure in any of the plurality of solar battery strings to be inspected, and the processor outputs to the output device by way of the communication interface a result indicating that the failure is present.

2. The solar power generation system according to claim 1, wherein the computer is configured to determine that there is a failure in the solar battery string to be inspected if either the first electric power loss or the second electric power loss is equal to or greater than a predetermined failure determination threshold value.

3. The solar power generation system according to claim 2, wherein, when it is determined that there is a failure in the solar battery string to be inspected, the computer is further configured to identify a factor of failure based on a result of comparison of magnitude of the first electric power loss and the second electric power loss.

4. The solar power generation system according to claim 1, wherein the processor, when calculating the expected electric power value of the solar battery string to be inspected in the first and second time bands, further calculates, based on data of a short-circuit current, an open-circuit voltage, an operation voltage, and an operation current of the solar battery module in a reference state, an expected amount of solar radiation and an expected operation temperature in the solar battery array from a ratio of the operation current and the short-circuit current in the solar battery array and a measurement current and a measurement voltage of the solar battery array, and, using the expected amount of solar radiation and expected operation temperature that have been calculated, calculates an expected electric power value of the solar battery string.

5. The solar power generation system according to claim 2, wherein the failure determination threshold value is set to a value such that electric power loss in case of failure of one of a plurality of cells constituting the solar battery modules of the solar battery string can be sensed.

6. The solar power generation system according to claim 1, wherein the processor further validates a diagnosis if a difference between an average amount of solar radiation in the first time band and an average amount of solar radiation in the second time band exceeds a threshold value of a predetermined amount of solar radiation.

7. A solar power generation system comprising:

a solar battery array comprising a plurality of solar battery strings connected in parallel, each solar battery string comprising a plurality of solar battery modules connected in series, a plurality of string measurement units that, with a string current measurement device, measure a current through each of the plurality of solar battery strings;

a sampling process unit receiving input from the string current measurement device, and supplying output to a signal conversion/transmission device; and a monitor device including a computer having a processor, a memory for storing programs, a storage device for storing necessary parameters, data, and measurement values, an output device, an input device, and a communication interface connecting the processor, the memory, the storage device, the output device, and the input device for communication, the computer configured to receive, via the communication interface, output from the signal conversion/transmission device permitting the processor to calculate a current loss in each of the plurality of solar battery strings and detect failure in each of the solar battery strings, wherein the input device acquires information about an amount of change in solar radiation in each of predetermined time bands in a day, and the processor extracts, from among the predetermined time bands of which the amount of change in solar radiation is smaller than a predetermined amount of change in solar radiation, a first time band indicating a minimum amount of solar radiation and a second time band indicating a maximum amount of solar radiation, the processor calculates, using a current value of the solar battery array in the first and second time bands, a reference current value of the solar battery string to be inspected in each of the first and second time bands, the processor calculates, from the measurement current value of the solar battery string to be inspected in the first and second time bands, the reference current value for the first time band, and the reference current value for the second time band, a first current loss in the first time band and a second current loss in the second time band, the processor detects, based on the first and second current losses, failure in any of the plurality of solar battery strings to be inspected, and the processor outputs to the output device by way of the communication interface a result indicating that the failure is present.

8. The solar power generation system according to claim 7, wherein the computer is configured to determine that there is a failure in the solar battery string to be inspected if either the first current loss or the second current loss is equal to or greater than a predetermined failure determination threshold value.

9. The solar power generation system according to claim 8, wherein, when it is determined that there is a failure in the solar battery string to be inspected, the computer is further configured to identify a factor of the failure based on a result of comparison of magnitude of the first current loss and the second current loss.

10. The solar power generation system according to claim 7, wherein the computer is configured to validate a diagnosis if a difference between an average amount of solar radiation in the first time band and an average amount of solar radiation in the second time band exceeds a threshold value of a predetermined amount of solar radiation.

11. A failure diagnosis method for a solar power generation system including a solar battery array comprising a plurality of solar battery strings connected in parallel, each of the solar battery strings comprising a plurality of solar battery modules connected in series, the method comprising the steps of:

providing a processor, a memory for storing programs, a storage device for storing necessary parameters, data, and measurement values, an output device, an input device, and a communication interface connecting the processor, the memory, the storage device, the output device, and the input device for communication;

measuring, with a plurality of string measurement units having a string current measurement device and a voltage measurement device, a current and voltage of each of the plurality of solar battery strings;

receiving, with a sampling process unit, input from each of the string current and voltage measurement devices;

supplying output from the sampling process unit to a signal conversion/transmission device;

acquiring, with the input device, information from the signal conversion/transmission device about an amount of change in solar radiation in each of predetermined time bands in a day, and extracting with the processor, from among the predetermined time bands of which the amount of change in solar radiation is smaller than a predetermined amount of change in solar radiation, a first time band indicating a minimum amount of solar radiation and a second time band indicating a maximum amount of solar radiation;

calculating, using a ratio of operation current and short-circuit current in the solar battery array, an expected electric power value of the solar battery string to be inspected in each of the first and second time bands with the processor;

calculating, from a measurement electric power value of the solar battery string to be inspected in the first and second time bands, the expected electric power value in the first time band, and the expected electric power value in the second time band, a first electric power loss in the first time band and a second electric power loss in the second time band with the processor;

detecting with the processor, based on the first and second electric power losses, a failure in the solar battery string to be inspected; and outputting from the processor to the output device by way of the communication interface a result indicating the presence of the failure.

12. The failure diagnosis method for a solar power generation system according to claim 11, wherein the step of detecting the failure includes determining with the processor that there is a failure in the solar battery string to be inspected if either the first or second electric power loss is equal to or greater than a predetermined failure determination threshold value.

13. The failure diagnosis method for a solar power generation system according to claim 12, further comprising identifying with the processor a factor of the failure based on a result of comparison of the magnitude of the first electric power loss and the second electric power loss when the failure in the solar battery string is present.

14. The failure diagnosis method for a solar power generation system according to claim 11, wherein the step of calculating the expected electric power value of the solar battery string to be inspected in each of the first and second time bands includes, with the processor, calculating (i), based on data of a short-circuit current, an open-circuit voltage, an operation voltage, and an operation current of the solar battery module in a reference state, an expected amount of solar radiation and an expected operation temperature of the solar battery array from a ratio of the operation current and the short-circuit current in the solar battery array and a measurement current and a measurement voltage of the solar battery array, and calculating (ii), using the expected amount of solar radiation and expected operation temperature that have been calculated, an expected electric power value of the solar battery string.

15. The failure diagnosis method for a solar power generation system according to claim 11, further comprising, with the processor, validating a diagnosis if a difference between an average amount of solar radiation in the first time band and an average amount of solar radiation in the second time band exceeds a threshold value of a predetermined amount of solar radiation.

* * * * *